(12) United States Patent
Fischer et al.

(10) Patent No.: US 12,208,764 B2
(45) Date of Patent: Jan. 28, 2025

(54) AIRBAG MODULE AND VEHICLE SEAT AND VEHICLE OCCUPANT PROTECTION SYSTEM

(71) Applicant: ZF AUTOMOTIVE GERMANY GMBH, Alfdorf (DE)

(72) Inventors: Anton Fischer, Schechingen-Leinweiler (DE); Robert Disam, Mutlangen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 94 days.

(21) Appl. No.: 17/641,112

(22) PCT Filed: Sep. 8, 2020

(86) PCT No.: PCT/EP2020/075060
§ 371 (c)(1),
(2) Date: Mar. 8, 2022

(87) PCT Pub. No.: WO2021/048117
PCT Pub. Date: Mar. 18, 2021

(65) Prior Publication Data
US 2022/0332273 A1 Oct. 20, 2022

(30) Foreign Application Priority Data
Sep. 10, 2019 (DE) ............ 10 2019 124 202.9

(51) Int. Cl.
*B60R 21/217* (2011.01)
*B60R 21/261* (2011.01)
*B60R 21/262* (2011.01)

(52) U.S. Cl.
CPC ........ *B60R 21/2171* (2013.01); *B60R 21/261* (2013.01); *B60R 21/262* (2013.01);
(Continued)

(58) Field of Classification Search
CPC . B60R 21/217; B60R 21/2171; B60R 21/233; B60R 21/261; B60R 2021/23146; B60R 2021/2615; B60R 2021/2617
See application file for complete search history.

(56) References Cited

U.S. PATENT DOCUMENTS

| 6,802,532 B2 * | 10/2004 | Heigl ............... B60R 21/26 280/736 |
| 7,278,656 B1 | 10/2007 | Kalandek |

(Continued)

FOREIGN PATENT DOCUMENTS

| CN | 101580049 A | * 11/2009 | ....... B60R 21/23138 |
| CN | 112805189 A | * 5/2021 | ......... B60R 21/2171 |

(Continued)

OTHER PUBLICATIONS

PCT International Search Report for corresponding International Application Serial No. PCT/EP2020/075060, mailed Oct. 27, 2020, pp. 1-4.

*Primary Examiner* — Barry Gooden, Jr.
(74) *Attorney, Agent, or Firm* — Tarolli, Sundheim, Covell & Tummino LLP (57) ABSTRACT

The invention describes an airbag module (10) comprising an airbag (12), an elongate gas generator (14) and a diffusor (16), wherein the gas generator (14) includes an outer housing (18) with outflow openings (20) distributed over the circumference (U) which define an outflow area (22), wherein the outflow area (22) of the gas generator (14) is enclosed by the diffusor (16), wherein the diffusor (16) has a central mount hole (24) into which the outer housing (18) protrudes so that the diffusor (16) circumferentially encloses an axial portion of the outer housing (18) which comprises the outflow area (22), wherein the diffusor (16) includes at least one contact face (26, 26*a*) and at least two gas guiding (Continued)

surfaces (28a, 28b) on the inner face of the diffusor (16) delimiting the mount hole (24), wherein the contact face (26, 26a) is directly adjacent to the outer housing (18) of the gas generator (14) and the gas guiding surfaces (28a, 28b) are radially spaced apart from the outer housing (18) while forming at least a first collection chamber (30a) and a second collection chamber (30b) into which gas flowing out of the outflow area (22) flows, wherein the first collection chamber (30a) opens into at least one first outlet opening (32a) and the second collection chamber (30b) opens into at least one second outlet opening (32b), wherein the first collection chamber (30a) is separated from the second collection chamber (30b) by the at least one contact face (26) specifically in the form of a separating web (34), wherein the diffusor (16) is completely arranged in an inflatable internal volume of the airbag (12), wherein the airbag (12) comprises at least a first airbag chamber (36a) and a second airbag chamber (36b) which are separated from each other, wherein the gas flowing into the first collection chamber (30a) flows, via the first outlet opening (32a), into the first airbag chamber (36a) of the airbag (12) and the gas flowing into the second collection chamber (30b) flows, via the second outlet opening (32b), into the second airbag chamber (36b) of the airbag (12).

28 Claims, 6 Drawing Sheets

(52) U.S. Cl.
CPC ............. *B60R 2021/2615* (2013.01); *B60R 2021/2617* (2013.01)

(56) References Cited

U.S. PATENT DOCUMENTS

| | | | | |
|---|---|---|---|---|
| 7,354,062 | B2 * | 4/2008 | Heigl | B60R 21/26 280/740 |
| 7,597,351 | B2 * | 10/2009 | Kashiwagi | B60R 21/261 280/736 |
| 7,644,950 | B2 * | 1/2010 | Kloss | B60R 21/261 280/740 |
| 11,548,466 | B2 * | 1/2023 | Disam | B60R 21/262 |
| 2003/0197357 | A1 * | 10/2003 | Heigl | B60R 21/26 280/736 |
| 2005/0194771 | A1 * | 9/2005 | Clark | B60R 21/261 280/736 |
| 2005/0248134 | A1 * | 11/2005 | Heigl | B60R 21/261 280/730.2 |
| 2007/0200327 | A1 * | 8/2007 | Kloss | B60R 21/261 280/740 |
| 2007/0284862 | A1 * | 12/2007 | Kashiwagi | B60R 21/2346 280/740 |
| 2019/0152424 | A1 | 5/2019 | Fukumoto et al. | |
| 2022/0001826 | A1 * | 1/2022 | Disam | B60R 21/262 |
| 2022/0274557 | A1 * | 9/2022 | Disam | B60R 21/261 |
| 2023/0146277 | A1 * | 5/2023 | Disam | B60R 21/2171 280/728.2 |

FOREIGN PATENT DOCUMENTS

| | | | | |
|---|---|---|---|---|
| CN | 114364579 A | * | 4/2022 | ......... B60R 21/2171 |
| DE | 19850448 A1 | | 5/2000 | |
| DE | 10318133 A1 | | 10/2003 | |
| DE | 102004022732 B3 | | 12/2005 | |
| DE | 102019100262 A1 | | 4/2020 | |
| DE | 102019124202 A1 | * | 3/2021 | ......... B60R 21/2171 |
| WO | 2020/069823 A1 | | 4/2020 | |
| WO | WO-2021048117 A1 | * | 3/2021 | ......... B60R 21/2171 |

* cited by examiner

AIRBAG MODULE AND VEHICLE SEAT AND VEHICLE OCCUPANT PROTECTION SYSTEM

RELATED APPLICATIONS

This application is a U.S. National Stage Application filed under 35 USC 371 claiming priority to Serial No. PCT/EP2020/075060, filed on 8 Sep. 2020; which claims priority from German Patent Application DE 10 2019 124 202.9, filed 10 Sep. 2019, the entireties of which are hereby incorporated herein by reference.

TECHNICAL FIELD

The invention relates to an airbag module, to a vehicle seat and to a vehicle occupant safety system.

BACKGROUND

For the protection of vehicle occupants in the event of crash, today's vehicles comprise vehicle occupant safety systems which also include airbag modules in addition to seatbelt systems. The airbags of the airbag modules may include plural airbag chambers separate from each other which have chamber volumes specifically different in size. For the gas distribution, gas distributing channels produced by seams of specific fabric layers, for example, are introduced into the interior of the airbag. Fabric layers of this type moreover help protect the airbag from the gas flow exiting the gas generator. For this purpose, for example the fabric layer can surround the outflow area of an elongate gas generator in the circumferential direction and, thus, can both protect the airbag fabric and deflect as well as distribute the gas flow.

The airbag must be protected from the gas flow exiting the gas generator. To this end, it is known, for example, to provide a specific fabric layer that surrounds the outflow area of the gas generator in the circumferential direction and that protects the airbag fabric as well as deflects the gas flow in the axial direction.

In addition, it is known to make use of airbags in such a way that they interact in a situation of restraint. For example, airbag modules integrated in the vehicle seat are known in which a thorax airbag interacts with a shoulder airbag, the shoulder airbag being utilized as a shoulder pusher to move the vehicle occupant away from the side structure of the vehicle so that the thorax airbag can be positioned as optimally as possible during deployment.

SUMMARY

It is the object of the invention to provide an airbag module, in particular for vehicle occupant safety systems, in which gas distribution to different airbag chambers is facilitated while providing a small overall size, proper adaptation to different geometries and low manufacturing costs.

Achieving the Object

The features according to the claims result in achieving the object. Advantageous configurations are described in the subclaims.

An airbag module according to the invention comprises at least one airbag, one elongate gas generator and one diffusor.

The airbag of the airbag module according to the invention comprises at least a first and a second airbag chamber which are separated from each other.

The gas generator has an outer housing with circumferentially distributed outflow openings defining an outflow area. The gas therefore flows out of the gas generator in a radial direction. The outflow openings are preferably evenly distributed over the circumference to keep the gas generator thrust-neutral upon activation thereof.

The outflow area of the gas generator is enclosed by the diffusor. The diffusor has a central mounting hole for the gas generator into which the outer housing of the gas generator protrudes such that the diffusor circumferentially encloses at least the axial portion of the outer housing of the gas generator which comprises the outflow area with the outflow openings.

The diffusor includes at least one contact face and at least two gas guiding surfaces on the inner face of the diffusor delimiting the mounting hole. The contact face is directly adjacent to the outer housing of the gas generator. The gas guiding surfaces are radially spaced apart from the outer housing of the gas generator while forming at least first and second collection chambers into which the gas flowing out of the outflow area of the gas generator flows. The first collection chamber opens into at least one first outlet opening and the second collection chamber opens into at least one second outlet opening.

The first collection chamber and the second collection chamber are separated from each other by the at least one contact face of the diffusor in particular in the form of a separating web.

In the airbag, the diffusor is completely arranged in an inflatable inner volume of the airbag. In the airbag module according to the invention, the gas flowing from the gas generator into the first collection chamber flows via the first outlet opening into the first airbag chamber of the airbag and the gas flowing from the gas generator into the second collection chamber flows via the second outlet opening into the second airbag chamber.

In one embodiment, the outlet openings extend in an axial direction over the entire outflow area at the outer housing of the gas generator. In such an embodiment, the contact face in the form of a separating web may abut on the outer housing in the outflow area such that one or more of the outlet openings are covered by the contact face in the form of a separating web.

In an alternative embodiment, the outflow area of the gas generator comprises first and second axial zones which are separated from each other by a separating area of the outer housing without any outflow openings. In such an embodiment, the contact face of the diffusor in the form of a separating web is preferably positioned on the outer housing in the outflow area so that the separating web abuts in the separating area between the first axial zone and the second axial zone. Thus, in such an embodiment, preferably none of the outlet openings is covered by the contact face in the form of a separating web. In such an embodiment, the gas flowing out of the first axial zone flows into the first collection chamber and gas flowing out of the second axial zone flows into the second collection chamber.

The diffusor of the airbag module can distribute the gas flow formed by the gas exiting the outflow area via the first and second collection chambers evenly or unevenly on a percentage basis to the first and second airbag chambers.

The gas flow can be distributed by percentage via the positioning of the contact face in the form of a separating web. Via the positioning of the separating web, in particular the size of the first collection chamber and the size of the second collection chamber and, thus, the percentage distribution can be determined. In addition, the percentage distribution can also be influenced by the size of the first and/or second outlet opening(s).

As an alternative, the percentage distribution of the gas flow can be determined or influenced via a proportion of the first to the second axial zone. In particular, the proportion of the first to the second axial zone can be influenced by the number of the outflow openings and/or the size, in particular the total surface area of the outflow openings in the first and second axial zones.

In one embodiment, the gas flow can be unevenly distributed on a percentage basis via the diffusor so that, in a completely filled state of the airbag, an internal pressure of the first airbag chamber is higher or lower than an internal pressure of the second airbag chamber. A different distribution can also be achieved by an uneven percentage distribution of the gas flow, if the chamber volumes of the first and second airbag chambers are equal.

If the first airbag chamber has a chamber volume that is larger or smaller than the chamber volume of the second airbag chamber, a different internal pressure in the first and second airbag chambers can also be achieved if the gas flow is evenly distributed on a percentage basis via the diffusor.

In addition, an uneven percentage distribution of the gas flow can be utilized to achieve a substantially even filling of first and second airbag chambers having chamber volumes different in size.

In order to ensure efficient gas distribution of the gas to the first and second airbag chambers of the airbag, an airbag chamber partition which separates the first airbag chamber from the second airbag chamber may include a diffusor mount. In particular in an embodiment in which the internal pressure of the first and second airbag chambers in the completely filled state of the airbag is different, the diffusor mount may comprise a sealing element. This can prevent overflow in the area of the diffusor mount when the airbag is filled.

In preferred embodiments, the airbag of the airbag module is in the form of a side airbag or a central airbag. Airbag modules with airbags of this type can be arranged specifically in or at a vehicle seat. Airbags of this type serve for the protection of the vehicle occupant in the case of side impact and can be used in particular for protecting the thorax area (thorax chamber), the shoulder area (shoulder chamber) and/or the head area (head chamber) of the vehicle occupant.

In one embodiment, the airbag can be in the form of a side airbag, for example, and the first airbag chamber can be a shoulder chamber and the second airbag chamber can be a thorax chamber. In such an embodiment, (in particular in the event of a near-side impact) the first airbag chamber can be quickly inflated at high pressure so that it urges against the shoulder of the vehicle occupant and moves the vehicle occupant away from the side structure of the vehicle such that a gap is formed between the vehicle occupant and the side structure. In this way, the second airbag chamber can be positioned better between the vehicle occupant and the side structure.

In an alternative embodiment, the airbag can be configured, for example, as a central airbag, and the first airbag chamber can be a head chamber and the second airbag chamber can be a thorax chamber. In such an embodiment (in particular in the event of a far-side impact) the first airbag chamber and the second airbag chamber may have chamber volumes different in size, for example, and nevertheless a substantially even filling of the first and second airbag chambers can be achieved by the uneven percentage distribution of the gas flow.

Further, the airbag of the airbag module may be a curtain airbag. An airbag module with such airbag is usually arranged in the area of the roof edge of the vehicle and serves for protecting the head area and/or the head and thorax area of the vehicle occupant. Such airbag can include, for example, a first airbag chamber for the front vehicle occupants and a second airbag chamber for the rear vehicle occupants which have chamber volumes different in size. The uneven percentage distribution of the gas flow can help achieve a substantially even filling of the first front airbag chamber and the second rear airbag chamber.

As a matter of course, the airbag of the airbag module can also be in the form of a knee airbag or a front airbag.

The object of the invention is further achieved by a vehicle seat comprising at least one afore-described airbag module according to the invention. The airbag module according to the invention is arranged in the vehicle seat, in particular in a backrest of the vehicle seat. In preferred embodiments, the airbag module is in the form of a side airbag module or a central airbag module.

In addition, the object of the invention is achieved by a vehicle occupant safety system comprising at least one vehicle seat according to the invention and/or at least one airbag module according to the invention.

BRIEF DESCRIPTION OF THE DRAWINGS

Further advantages, features and details of the invention will be evident from the following description of an embodiment that is not to be understood as limiting and by means of the drawings, wherein.

DESCRIPTION

Figure 1:
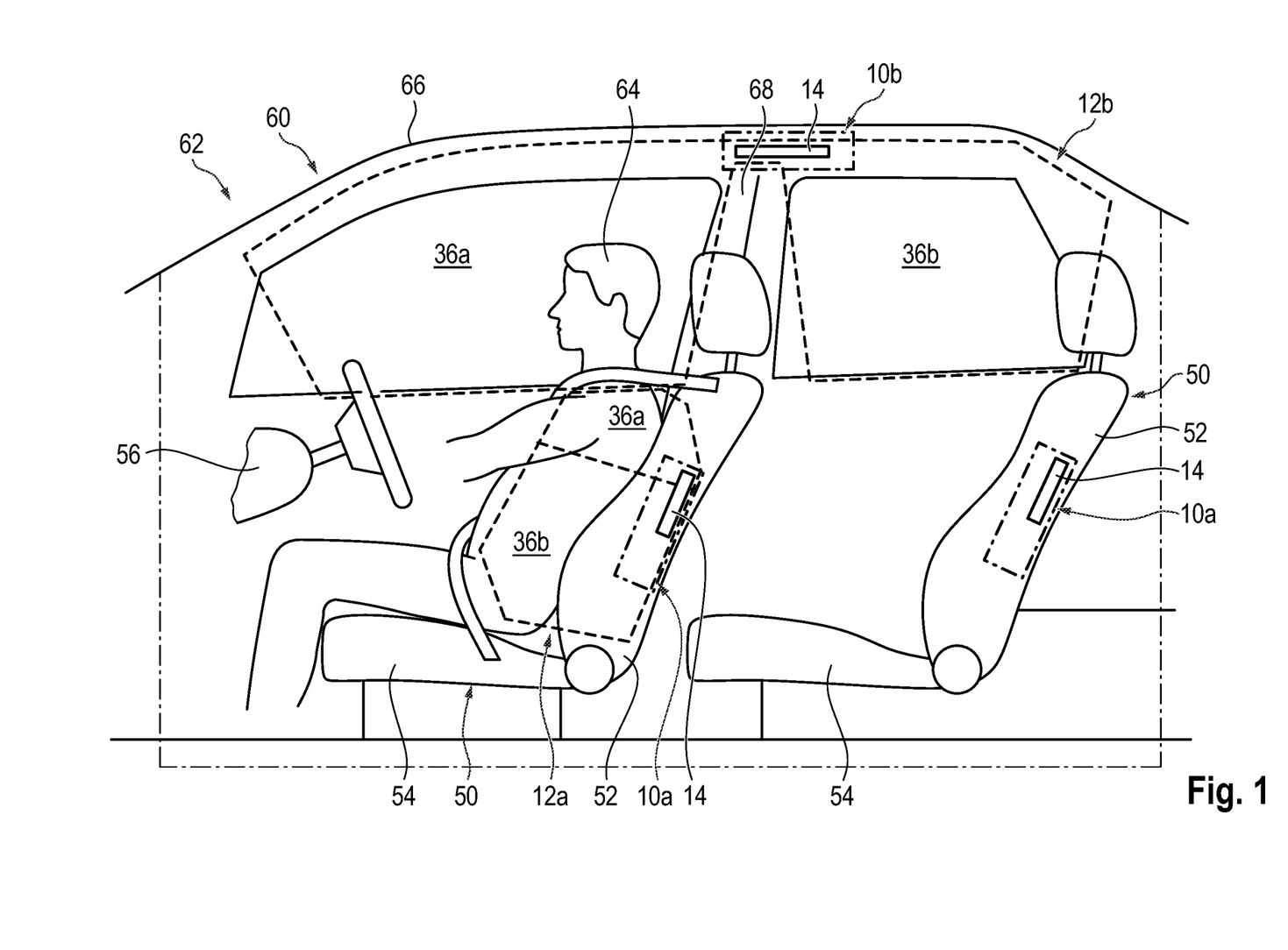
FIG. 1 shows a schematic lateral view of a vehicle comprising a vehicle occupant safety system according to the invention with different embodiments of an airbag module according to the invention.

FIG. 1 illustrates a vehicle 62 comprising a vehicle occupant safety system 60 according to the invention for a vehicle occupant 64 which includes plural airbag modules 10 according to the invention. FIG. 1 shows, of the vehicle occupant safety system 60, an airbag module 10*b* with an airbag 12 in the form of a curtain airbag 12*b* and an airbag module 10*a* with an airbag 12 in the form of a side airbag 12a in a deployed state and a non-activated further airbag module 10a arranged laterally in the backrest 52 of the rear vehicle seat 50.

The airbag module 10b including the curtain airbag 12b is arranged in the area of a roof edge 66 of the vehicle 62, the gas generator 14 of the airbag module 10b being arranged in the area of the B-pillar 68.

The airbag modules 10a are disposed in the backrests 52 of each of the front and rear vehicle seats 50.

Airbag modules 10 according to the invention can also be disposed in the seat surface 54 of the vehicle seat 50, for example, and/or in the instrument panel 56 of the vehicle 62 and can be in the form of a central airbag, knee airbag and/or front airbag, for example (not shown).

Figure 2:
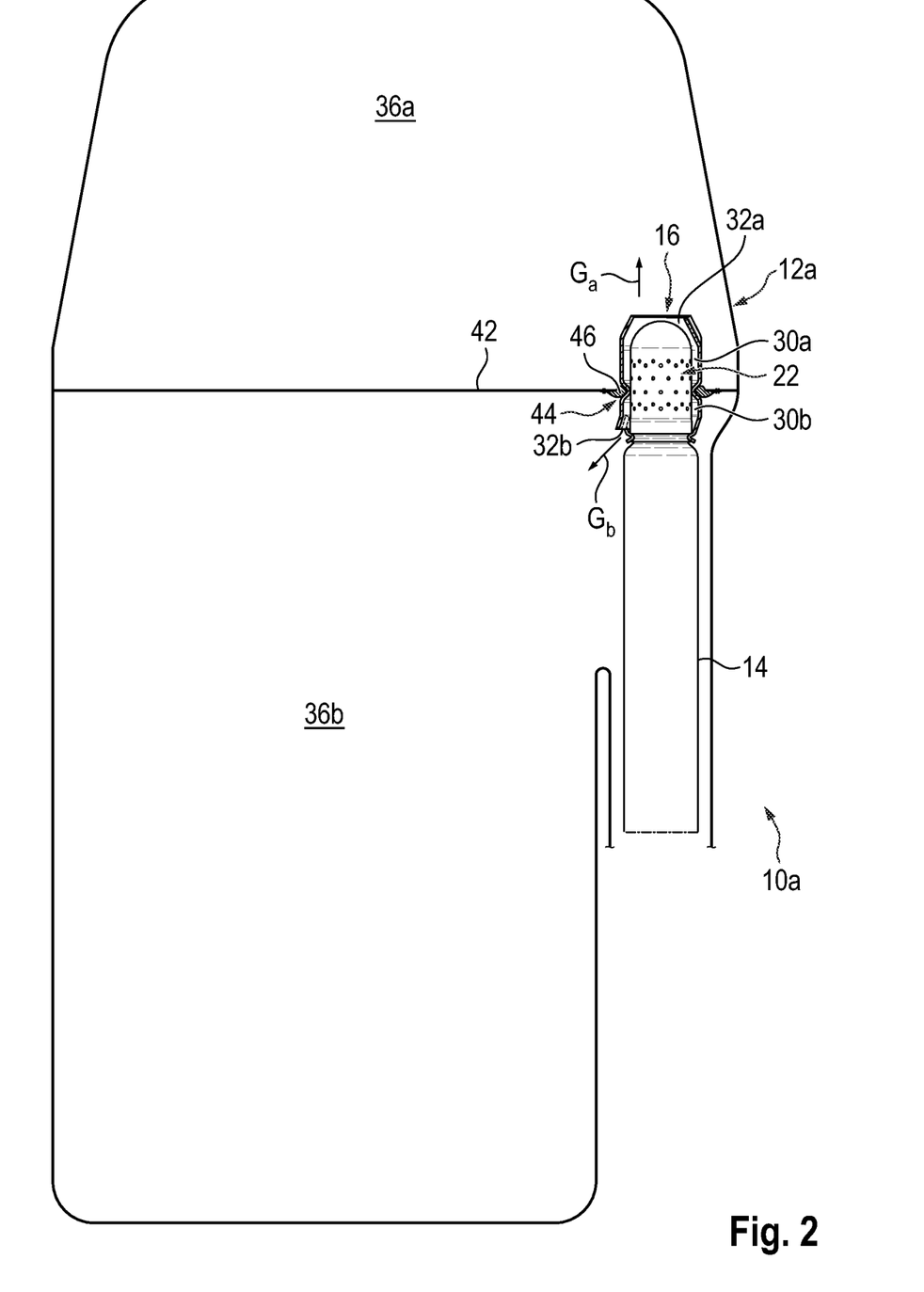
FIG. 2 shows a schematic representation of a first embodiment of an airbag module according to the invention.

The airbag 12 in the form of a side airbag 12a of the airbag module 10a has a first airbag chamber 36a and a second airbag chamber 36b which are separated from each other by an airbag chamber partition 42, see also FIG. 2.

In the embodiment of FIGS. 1 and 2, the first airbag chamber 36a is a shoulder chamber and the second airbag chamber 36b is a thorax chamber. The chamber volume of the first airbag chamber 36a is smaller than the chamber volume of the second airbag chamber 36b. In this case, the gas generator 14 of the airbag module 10a is arranged substantially in the internal volume of the airbag 12 in the form of a side airbag 12a, the diffusor 16 that deflects the gas flowing out of the gas generator 14 and distributes the same to the internal volume of the side airbag 12a being arranged completely in the internal volume of the side airbag 12a.

The diffusor is arranged, in the shown embodiment, in a diffusor mount 44 disposed in the airbag chamber partition 42. The airbag chamber partition 42 of the airbag 12 in the form of a side airbag 12a is configured to be substantially gas-tight in the shown side airbag 12a. The diffusor mount 44 of the airbag chamber partition 42 moreover comprises a sealing element 46 that is capable of strongly restricting or at best preventing overflow of gas from the first airbag chamber 36a into the second airbag chamber 36b at least during the filling operation of the side airbag 12, 12a. Accordingly, the sealing element 46 engages a bead 35 (see FIGS. 4 and 6) which is formed by the contact face 26 in the form of a separating web 34.

The diffusor 16 comprises a first collection chamber 30a from which, via a first outlet opening 32a, the gas (represented by the arrow Ga) flowing out of the gas generator 14 into the first collection chamber 30a can flow into the first airbag chamber 36a of the side airbag 12a, and a second collection chamber 30b from which, via a second outlet opening 32b, the gas (represented by the arrow Gb) flowing out of the gas generator 14 into the second collection chamber 30b can flow into the second airbag chamber 36b of the side airbag 12a. The gas flow formed by the gas flowing out of the outflow area 22 (see also FIGS. 4 to 7) of the gas generator 14 is distributed substantially evenly on a percentage basis to the first and second airbag chambers 36a and 36b via the first and second collection chambers 30a and 30b. In this way, the first airbag chamber 36a has a higher internal pressure than the second airbag chamber 36b and is moreover filled more quickly.

In such a side airbag 12a, the first airbag chamber 36a can thus be quickly inflated at a high internal pressure so that it urges against the shoulder of the vehicle occupant 64 and moves the vehicle occupant 64 away from the side structure of the vehicle 62 in such a way that the second airbag chamber 36b can be positioned better between the vehicle occupant 64 and the side structure of the vehicle 62.

Figure 3:
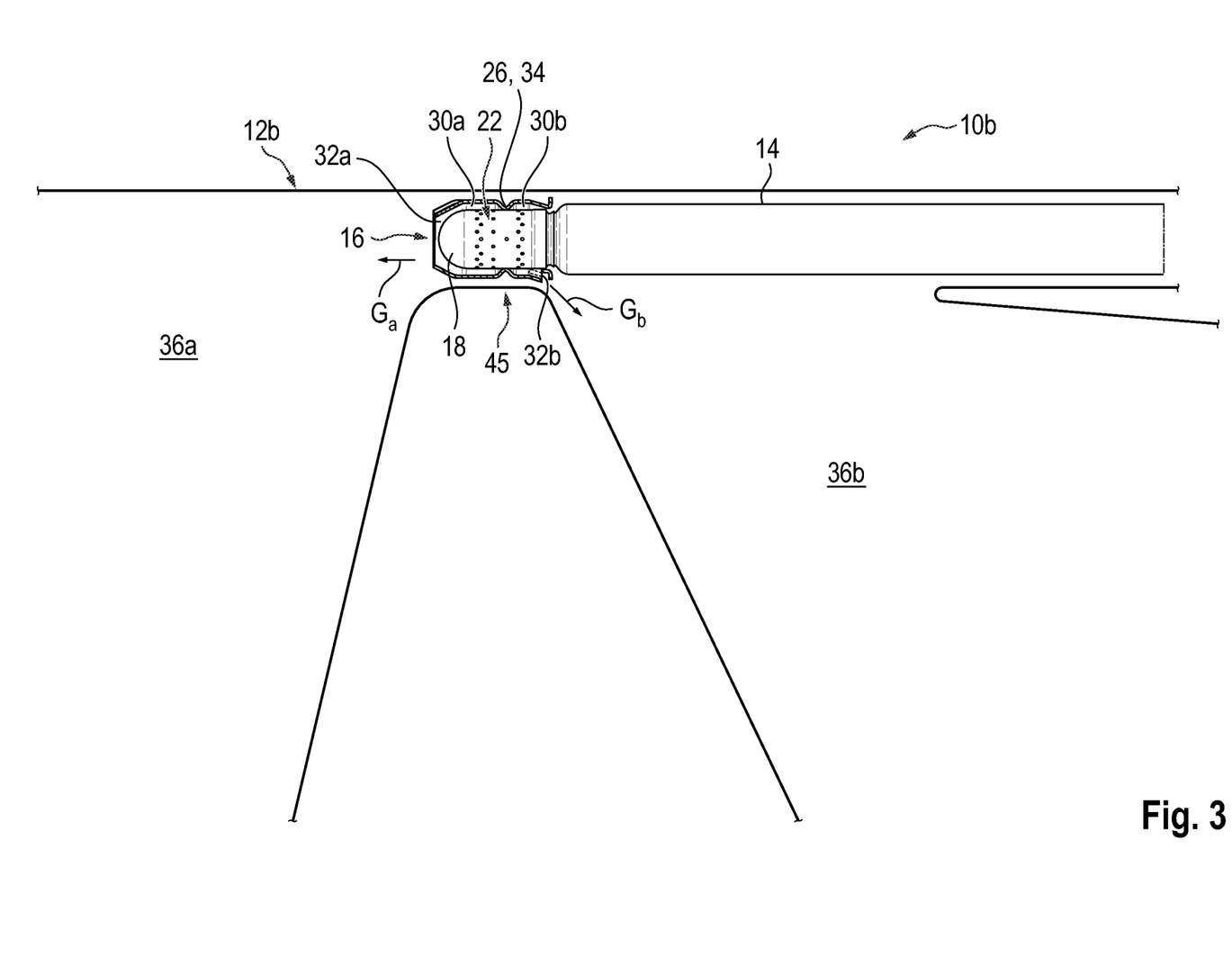
FIG. 3 shows a schematic partial representation of a second embodiment of an airbag module according to the invention.

FIG. 3 illustrates a partial view of the injection area of the airbag module 10b with the airbag 12 in the form of a curtain airbag 12b which serves for the protection of the head area of the vehicle occupant 64. The curtain airbag 12b shown in FIGS. 1 and 3 includes a first airbag chamber 36a for the front vehicle occupants 64 and a second airbag chamber 36b for the rear vehicle occupants 64 having chamber volumes different in size (in FIG. 1 only the front vehicle seat 50 is occupied by a vehicle occupant 64). The uneven percentage distribution of the gas flow via the first collection chamber 30a and the second collection chamber 30b of the diffusor 16 can help achieve a substantially even filling of the first front airbag chamber 36a and the second rear airbag chamber 36b. The first front airbag chamber 36a and the second rear airbag chamber 36b are separated from each other by the tubular diffusor mount.

The diffusor 16 is located in the internal volume of the airbag 12 in the form of a curtain airbag 12b in a tubular diffusor mount 45 such that the gas flowing out of the first outlet opening 32a of the first collection chamber 30a (shown by the arrow Ga) flows into the first airbag chamber 36a and the gas flowing out of the second outlet opening 32b of the second collection chamber 30b (shown by the arrow Gb) flows into the second airbag chamber 36b of the curtain airbag 12b.

The gas flow formed by the gas flowing out of the outflow area 22 (see also FIGS. 4 to 7) of the gas generator 14 is unevenly distributed on a percentage basis to the first and second airbag chambers 36a and 36b via the first and second collection chambers 30a and 30b. Thus, a substantially even filling of the first front airbag chamber 36a and the second rear airbag chamber 36b can be obtained, although they have chamber volumes different in size (see FIG. 1). Accordingly, it is not necessary to seal the tubular diffusor mount 45 against the outer wall of the diffusor 16, as the first and second airbag chambers 30a and 30b in this example have substantially the same internal pressure. The gas generator 14 can be additionally fixed with the diffusor 16 in the diffusor mount 45 of the airbag 12, where necessary, via an outboard airbag fastener such as a clamp, a retaining strap or a clip collar (not shown).

Figure 4:
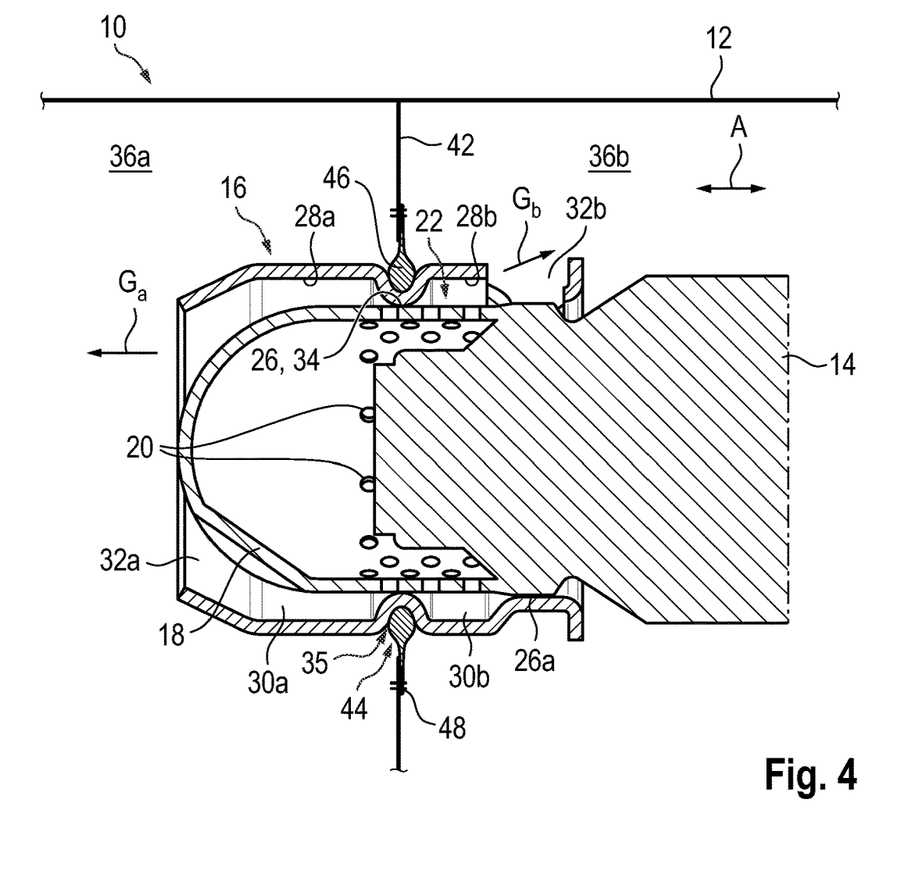
FIG. 4 shows an enlarged schematic representation of an inflation area of a third embodiment of an airbag module according to the invention.
Figure 5:
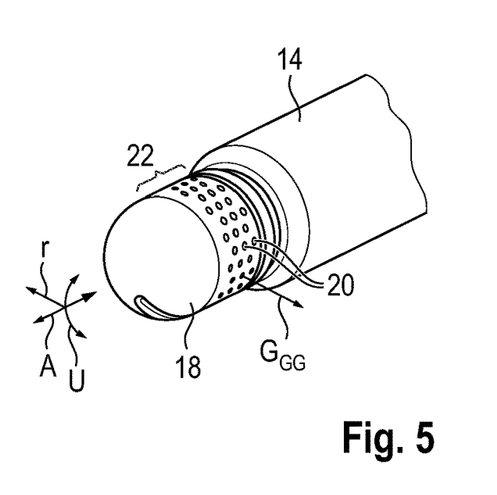
FIG. 5 shows a schematic perspective representation of an axial end of a gas generator which can be used for an airbag module according to the invention.

FIG. 4 illustrates a detail view of the injection area of a third embodiment of an airbag module 10 according to the invention. The already introduced reference symbols are maintained for the individual elements which differ only as to their shape and/or position but not as to their function.

The airbag 12 in this case also includes an airbag chamber partition 42 with a diffusor mount 44 comprising a sealing element 46. The sealing element 46 is connected, in the area of the diffusor mount 44, to the airbag chamber partition 42 via a seam 48. The seam 48 can be, for example, a stitched seam, a welded seam, in particular an ultrasonic weld, a bonded seam or else a combination of the afore-mentioned seams. In an alternative embodiment (not shown), the diffusor mount 44 can be formed merely by an opening in the airbag chamber partition 42 into which the diffusor is introduced so that, via the first outlet opening 32a, the first airbag chamber 30a can be filled with gas and, via the second outlet opening 32b, the second airbag chamber 30b can be filled with gas.

Figure 6:
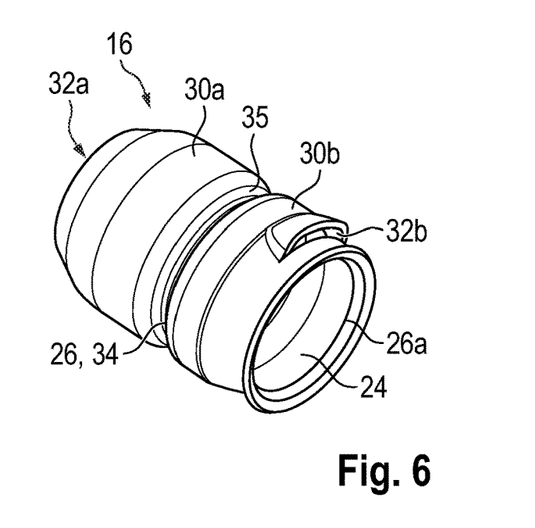
FIG. 6 shows a schematic perspective representation of a diffusor which can be used for an airbag module according to the invention, and each of FIG. 7 *a*) to *c*) shows an enlarged schematic representation of an inflation area of a fourth, fifth and sixth embodiment of an airbag module according to the invention.

The diffusor 16 (see also FIG. 6 showing an alternative embodiment of the diffusor 16) includes a mount hole 24 into which the outer housing 18 of the gas generator 14 protrudes so that the diffusor 16 circumferentially encloses an axial portion of the outer housing 18 which comprises the outflow area 22 including the outflow openings 20. The outflow openings 20 are distributed over the circumference U in the outer housing 18 and define the outflow area 22 of the gas generator 14 (see also FIG. 5).

The diffusor 16 shown here includes contact faces 26 and 26*a* as well as two gas guiding surfaces 28*a* and 28*b* on the inner face delimiting the mount hole 24. The contact faces 26 and 26*a* are directly adjacent to the outer housing 18 of the gas generator 14. The gas guiding surfaces 28*a* and 28*b* are radially spaced apart from the outer housing 18 while forming a first collection chamber 30*a* and a second collection chamber 30*b*. The first collection chamber 30*a* and the second collection chamber 30*b* are separated from each other by the contact face 26 in the form of a separating web 34. The separating web 34 forms a bead 35 which the sealing element 46 of the diffusor mount 44 engages.

The gas flowing into the first collection chamber 30*a* flows via the first outlet opening 32*a* into the first airbag chamber 36*a* of the airbag 12 and the gas flowing into the second collection chamber 30*b* flows via the second outlet opening 32*b* into the second airbag chamber 36*b* of the airbag 12.

In this embodiment, the contact face 26 in the form of a separating web 34 abuts in the outflow area 22 such that several of the outflow openings are covered and, thus, closed by the contact face 26. Via positioning the contact face 26 in the form of the separating web 34, in this case the percentage distribution of the gas flow formed by the gas exiting the outflow area 22 to the first and second airbag chambers 30*a* and 30*b* can be adapted to the respective purpose of the airbag 12.

Further, via the collection chambers 30*a* and 30*b* of the diffusor 16, the gas flow exiting the outflow area 22 of the outer housing 18 of the gas generator 14 in the radial direction r (shown by the arrow GGG) is deflected to the substantially axial outflow directions Ga and Gb.

Figure 7A:
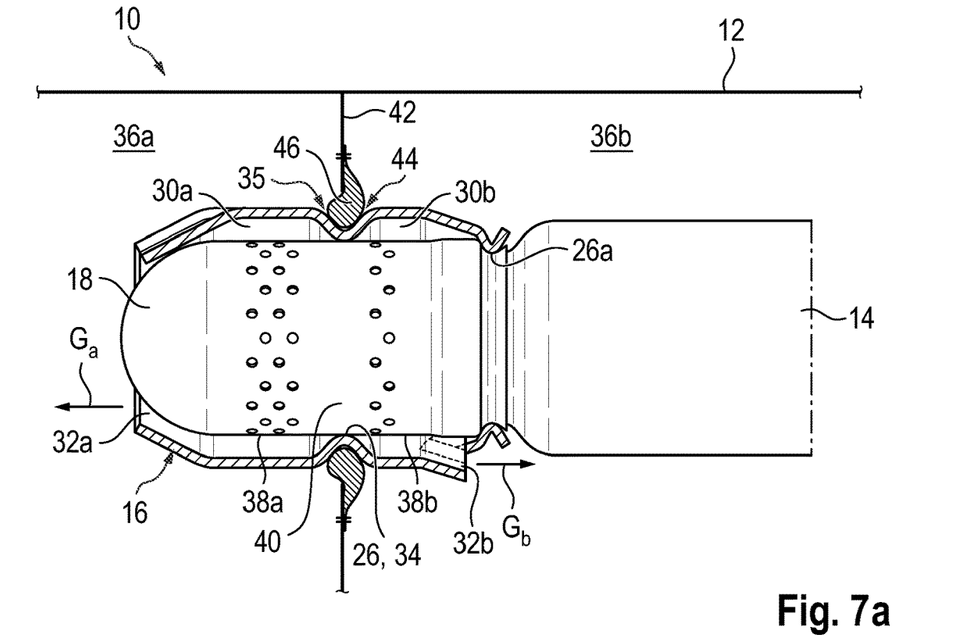
Figure 7B:
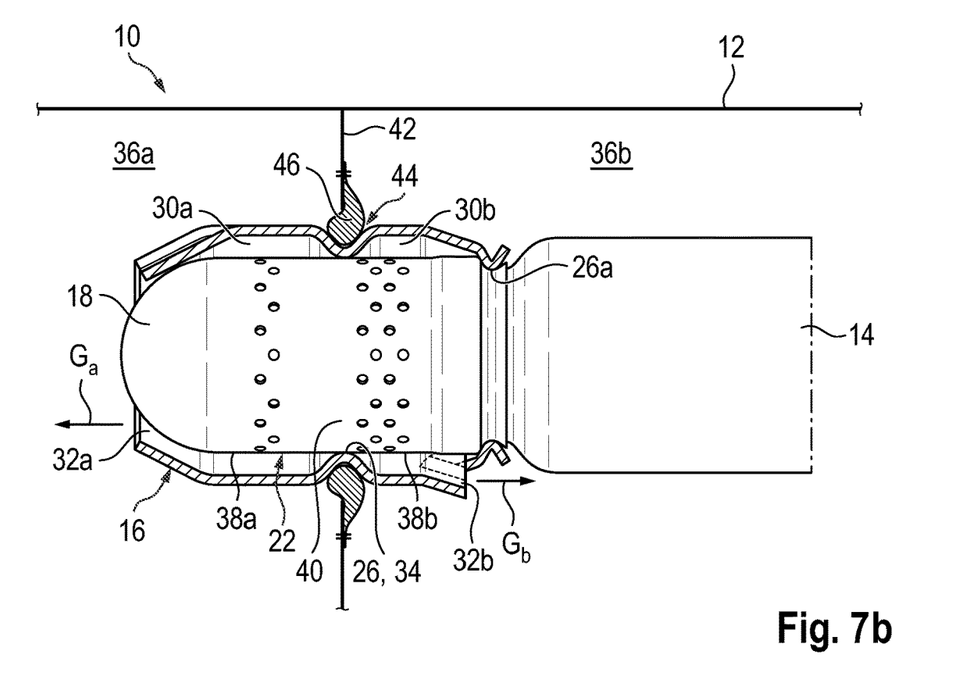
Figure 7C:
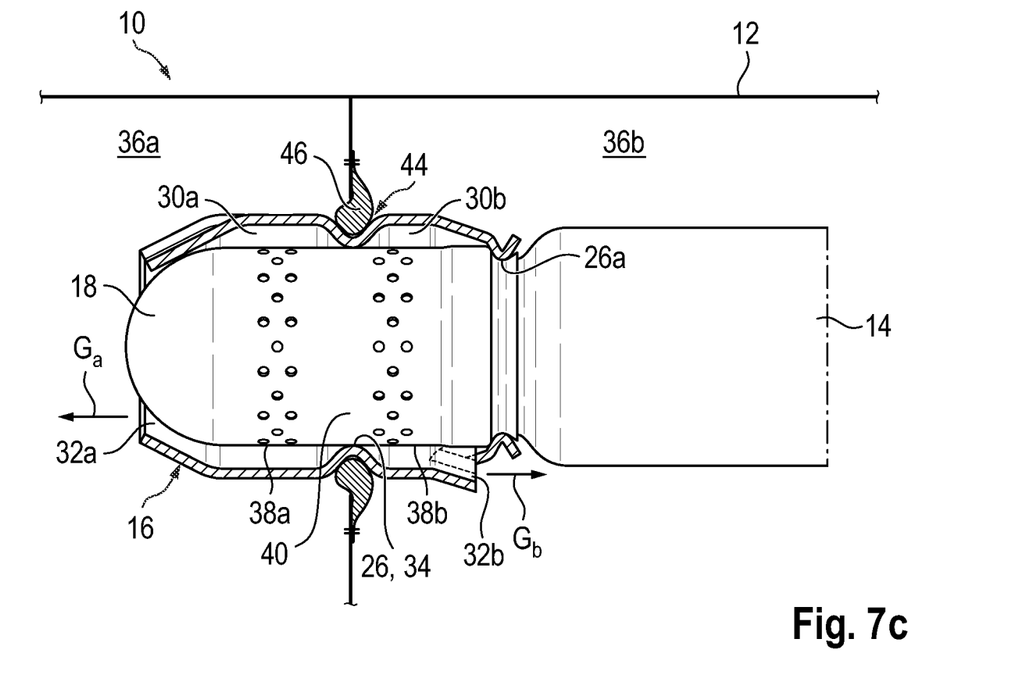

FIGS. 7*a*) to *c*) show a detail view of fourth, fifth and sixth embodiments of an airbag module 10 according to the invention. The already introduced reference symbols are maintained for the individual elements which differ only as to their shape and/or position but not as to their function, and substantially the differences from the preceding embodiments are emphasized.

The airbag modules of FIG. 7 *a*) to *c*) include a diffusor 16 as it is detailed in FIG. 6. The embodiments shown in FIG. 7 differ from the embodiments of the preceding Figures particularly by the design of the outer housing 18 of the gas generator 14.

The outflow area 22 of the gas generator 14 includes a first axial zone 38*a* and a second axial zone 38*b* in the embodiments illustrated in FIG. 7. The first axial zone 38*a* and a second axial zone 38*b* are separated from each other by a separating area 40 of the outer housing 18 which includes no outflow openings 20, The contact face 26 of the diffusor 16 in the form of a separating web 34 is positioned in the separating area 40 between the first axial zone 38*a* and the second axial zone 38*b*.

The proportion of the first axial zone 38*a* to the second axial zone 38*b* in these embodiments determines the percentage distribution of the gas flow. In the shown embodiments, the proportion of the first axial zone 38*a* to the second axial zone 38*b* is determined by the number of the outflow openings 20 which are arranged in each of the first axial zone 38*a* and the second axial zone 38*b*.

In FIG. 7 *a*), the outflow openings 20 are distributed to the first and second axial zones 38*a* and 38*b* such that, in the area of the first axial zone 38*a*, approximately two thirds of the gas flow exit into the first collection chamber 30*a* and, in the second axial zone 38*b*, approximately one third of the gas flow exits into the second collection chamber 30*b*.

In FIG. 7 *b*), the outflow openings 20 are distributed to the first and second axial zones 38*a* and 38*b* such that, in the area of the first axial zone 38*a*, approximately one third of the gas flow exits into the first collection chamber 30*a* and, in the second axial zone 38*b*, approximately two thirds of the gas flow exit into the second collection chamber 30*b*.

In FIG. 7 *c*), the outflow openings 18 are distributed symmetrically/evenly to the first and second axial zones 38*a* and 38*b* so that approximately half of the gas flow in the first axial zone 38*a* exits into the first collection chamber 30*a* and half of the gas flow in the second axial zone 38*b* exits into the second collection chamber 30*b*.

As a matter of course, the skilled person can also produce other percentage ratios of the gas flow distribution to the first axial zone 38*a* and the second axial zone 38*b* by a distribution and/or a size of the outflow openings 20 adapted to the purpose of the airbag module 10.

It is the advantage of such an embodiment that the diffusor 16 can be designed as a standard component: An adaptation of the percentage gas distribution which is in particular dependent on the intended purpose and the intended mounting position of the airbag 12 of the respective airbag module 10 can be brought about in a simple and low-cost manner by an adaptation to the outer housing 18. Accordingly, the outer housing 18 is adapted preferably by an adaptation of the number and/or the size of the outflow openings 20 associated with the first and second axial zones 38*a* and 38*b* in the outflow area 22 of the outer housing 18 of the gas generator 14.

The invention claimed is:

1. An airbag module comprising an airbag, an elongate gas generator and a diffusor, wherein the gas generator has an outer housing with outflow openings distributed over a circumference which define an outflow area, wherein the outflow area of the gas generator is enclosed by the diffusor, wherein the diffusor has a central mount hole into which the outer housing protrudes so that the diffusor circumferentially encloses an axial portion of the outer housing comprising the outflow area, wherein the diffusor has at least one contact face and at least two gas guiding surfaces on an inner face of the diffusor delimiting the mount hole, wherein the at least one contact face is directly adjacent to the outer housing of the gas generator and the gas guiding surfaces are radially spaced apart from the outer housing while forming at least a first collection chamber and a second collection chamber into which gas flowing out of the outflow area flows, wherein the first collection chamber opens into at least a first outlet opening and the second collection chamber opens into at least a second outlet opening, wherein the first collection chamber is separated from the second collection chamber by the at least one contact face, wherein the diffusor is completely arranged in an inflatable internal volume of the airbag, wherein the airbag comprises at least a first airbag chamber and a second airbag chamber which are separated from each other by a partition that prevents overflow of gas from the first airbag chamber into the second airbag chamber, wherein the gas flowing into the first collection chamber flows, via the first outlet opening, into the first airbag chamber of the airbag and the gas flowing into the second collection chamber flows, via the second outlet opening, into the second airbag chamber of the airbag, and wherein the outflow area of the gas generator comprises a first axial zone and a second axial zone which are separated from each other by a separating area of the outer housing without any outflow openings, wherein the at least one contact face of the diffusor in the form of a separating web is positioned in the separating area between the first axial zone and the second axial zone.

2. The airbag module according to claim 1, wherein the diffusor distributes a gas flow formed by the gas exiting the outflow area via the first and second collection chambers evenly on a percentage basis or unevenly on the percentage basis to the first and second airbag chambers.

3. The airbag module according to claim 1, wherein a positioning of the at least one contact face in the form of the separating web and/or a proportion of the first axial zone to the second axial zone determine(s) a percentage distribution of the gas flow.

4. The airbag module according to claim 3, wherein the proportion of the first axial zone to the second axial zone can be adapted by a number and/or size of the outflow openings in the first axial zone and the second axial zone.

5. The airbag module according to claim 1, wherein the airbag includes a diffusor mount in an airbag chamber partition.

6. The airbag module according to claim 5, wherein the diffusor mount includes a sealing element.

7. The airbag module according to claim 1, wherein an internal pressure of the first airbag chamber in a completely filled state of the airbag is higher or lower than an internal pressure of the second airbag chamber.

8. The airbag module according to claim 1, wherein the airbag is a side airbag or a central airbag.

9. The airbag module according to claim 8, wherein an airbag chamber is a shoulder chamber.

10. The airbag module according to claim 1, wherein the airbag is a curtain airbag.

11. A vehicle seat, comprising an airbag module according to claim 1, wherein the airbag module is arranged in the vehicle seat.

12. The vehicle seat according to claim 11, wherein the airbag module is arranged in a backrest of the vehicle seat.

13. A vehicle occupant safety system, comprising at least one vehicle seat according to claim 11.

14. A vehicle occupant safety system, comprising at least one airbag module according to claim 1.

15. An airbag module comprising an airbag, an elongate gas generator and a diffusor, wherein the gas generator has an outer housing with outflow openings distributed over a circumference which define an outflow area, wherein the outflow area of the gas generator is enclosed by the diffusor, wherein the diffusor has a central mount hole into which the outer housing protrudes so that the diffusor circumferentially encloses an axial portion of the outer housing comprising the outflow area, wherein the diffusor has at least one contact face and at least two gas guiding surfaces on an inner face of the diffusor delimiting the mount hole, wherein the at least one contact face is directly adjacent to the outer housing of the gas generator and the gas guiding surfaces are radially spaced apart from the outer housing while forming at least a first collection chamber and a second collection chamber into which gas flowing out of the outflow area flows, wherein the first collection chamber opens into at least a first outlet opening and the second collection chamber opens into at least a second outlet opening, wherein the first collection chamber is separated from the second collection chamber by the at least one contact face, wherein the diffusor is completely arranged in an inflatable internal volume of the airbag, wherein the airbag comprises at least a first airbag chamber and a second airbag chamber which are separated from each other, wherein the gas flowing into the first collection chamber flows, via the first outlet opening, into the first airbag chamber of the airbag and the gas flowing into the second collection chamber flows, via the second outlet opening, into the second airbag chamber of the airbag, wherein the outflow area of the gas generator comprises a first axial zone and a second axial zone which are separated from each other by a separating area of the outer housing without any outflow openings, wherein the at least one contact face of the diffusor in the form of a separating web is positioned in the separating area between the first axial zone and the second axial zone.

16. The airbag module according to claim 15, wherein the diffusor distributes a gas flow formed by the gas exiting the outflow area via the first and second collection chambers evenly on a percentage basis or unevenly on the percentage basis to the first and second airbag chambers.

17. The airbag module according to claim 15, wherein a positioning of the at least one contact face in the form of the separating web and/or a proportion of the first axial zone to the second axial zone determine(s) a percentage distribution of the gas flow.

18. The airbag module according to claim 17, wherein the proportion of the first axial zone to the second axial zone can be adapted by a number and/or size of the outflow openings in the first axial zone and the second axial zone.

19. The airbag module according to claim 15, wherein the airbag includes a diffusor mount in an airbag chamber partition.

20. The airbag module according to claim 19, wherein the diffusor mount includes a sealing element.

21. The airbag module according to claim 15, wherein an internal pressure of the first airbag chamber in a completely filled state of the airbag is higher or lower than an internal pressure of the second airbag chamber.

22. The airbag module according to claim 15, wherein the airbag is a side airbag or a central airbag.

23. The airbag module according to claim 22, wherein an airbag chamber is a shoulder chamber.

24. The airbag module according to claim 15, wherein the airbag is a curtain airbag.

25. A vehicle seat, comprising an airbag module according to claim 15, wherein the airbag module is arranged in the vehicle seat.

26. The vehicle seat according to claim 25, wherein the airbag module is arranged in a backrest of the vehicle seat.

27. A vehicle occupant safety system, comprising at least one vehicle seat according to claim 25.

28. A vehicle occupant safety system, comprising at least one airbag module according to claim 15.

* * * * *